Dec. 22, 1931.  A. C. GRUNWALD  1,837,814
BATTERY TERMINAL
Filed Sept. 28, 1928
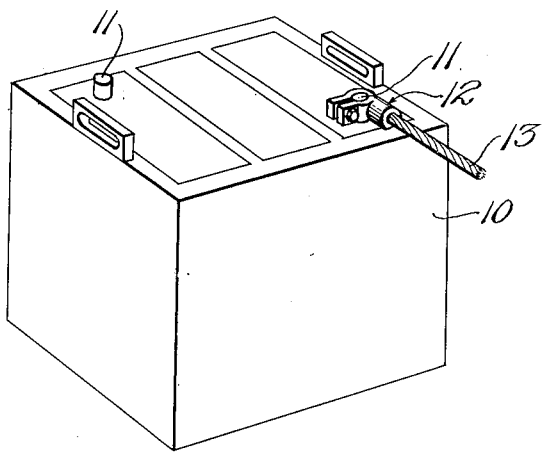
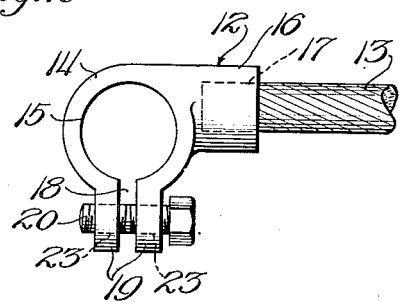
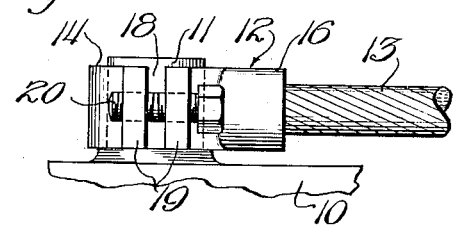
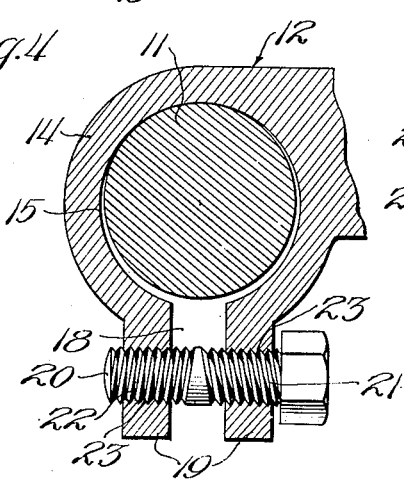
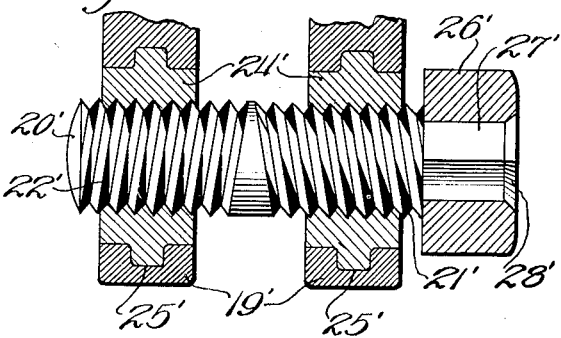
Inventor:
Albert C. Grunwald
By Williams, Bradbury, McCaleb & Hinkle
Attys.

Patented Dec. 22, 1931

1,837,814

UNITED STATES PATENT OFFICE

ALBERT C. GRUNWALD, OF RIVER FOREST, ILLINOIS, ASSIGNOR TO PRECISION METAL WORKERS, OF CHICAGO, ILLINOIS, A CORPORATION OF ILLINOIS

BATTERY TERMINAL

Application filed September 28, 1928. Serial No. 308,958.

The present invention relates to battery terminals, and is more particularly concerned with the provision of an improved terminal for use with storage batteries and the like.

Storage batteries of the type now in general use are provided with round terminal projections or posts, which are adapted to have clamped to them a terminal member, which is more or less permanently connected to a wire or conduit. Acid and other liquids from the storage battery, as well as the fumes therefrom, often cause these terminals and posts to corrode to such an extent as to render their disengagement difficult.

An object of my invention is to provide a clamping terminal, which is adapted to positively release itself from the battery post.

Another object of my invention is to provide a positively releasing clamping terminal of novel construction.

Another object of my invention is to provide a clamping terminal which is simple in construction and which may be economically manufactured.

Another object of the invention is the provision of an improved method of constructing battery terminals.

Other objects will appear from the following description, reference being had to the accompanying drawings, in which—

Fig. 1 is a perspective view of a storage battery which has one of my improved clamping terminals connected to one of its post-terminals;

Fig. 2 is a top plan view of my improved clamping terminal;

Fig. 3 is a side elevational view showing my terminal connected to a post of a storage battery;

Fig. 4 is an enlarged fragmentary cross-sectional view of my terminal when expanded for removal from or application to the battery post;

Fig. 5 is an enlarged fragmentary vertical section of a terminal of modified structure.

Referring to the drawings, 10 indicates a storage battery which is provided with round metallic projections or posts 11 of opposite polarity, which posts are adapted to receive suitable clamping terminal members.

Secured to one of these posts 11 is my improved clamping terminal, indicated as a whole at 12, which has a suitable electrical conduit or cable 13, more or less permanently secured to it.

The terminal 12 may be made of any suitable metal, such as brass, bronze, copper, lead, or the like, and consists of a cylindrical body member 14, provided with a smooth recess 15, and a lateral projecting cylindrical portion 16. This portion 16 is preferably integrally formed with the cylindrical body member 14, and is provided with a recess 17 adapted to receive the cable 13. The cable 13 may be soldered or otherwise suitably secured within the recess 17.

The body member 14 may be provided with a perpendicular slot 18, and may have lugs 19 formed thereon, which protrude in a lateral direction upon opposite sides of the slot 18. These lugs 19 are preferably integrally formed with the body member 14. A suitable bolt 20 preferably of a harder material, such as steel, or the like, is provided with right-hand threads 21 and left-hand threads 22, both of which engage complementary threads 23 formed in opposite holes in the lugs 19. Thus, by rotating the bolt 20 to the right, the lugs 19 are forced apart, causing the walls of the body member 14 to be sprung outwardly, so that the clamping terminal 12 is positively released from clamping engagement with the post 11. Upon reversing the rotation of the bolt 20, the lugs 19 are drawn toward each other, causing the walls of the body member 14 to be sprung inwardly so that the clamping terminal 12 is firmly clamped upon the post 11.

The terminal 12 is preferably cast or molded. This method of manufacture permits the steel bolt 20 to be placed in the mold and the softer metal, i. e., brass, bronze, copper, lead, etc., is then poured into the mold. The softer metal will not weld or adhere to the steel bolt, but will closely surround it to form threads therein complementary to those already upon the bolt 20.

While the above method of manufacture will generally be found to be the most desirable, however, in the event it is desired to have the threads in the lugs 19 formed from harder material, the modified structure shown in Fig. 5 may be used. The bolt 20' is provided with right and left-hand threads 21' and 22' respectively. Threaded steel bushings 24' are screwed upon the bolt 20' and the assembly is then placed in the mold for forming the terminal and the brass, bronze, etc. poured around the bushings 24'. These bushings 24' are preferably of square configuration, and are provided with one or more flanges 25' to prevent their becoming disengaged from the lugs 19'.

In order to permit the bushing 24' to be engaged with the threads of the bolt 20' nearest the head 26' the stem of the bolt 20' is separable from the head 26'. The bushing 24' may be screwed upon the stem of the bolt 20' and the head 26' is then fitted over the squared end 27' with this stem. This squared end 27' of the stem may be rivet flanged as shown at 28' to prevent the head 26' from becoming separated therefrom.

The engagement and disengagement of my terminal from the posts 11 should be apparent from the foregoing description. To engage the terminal 12 with one of the posts 11, the bolt 20 is rotated until the walls of the body member 14 are sprung outwardly to permit it to fit over the post 11 of the battery. The bolt 20 is then rotated in the opposite direction, causing the walls of the body member 14 to be sprung inwardly until the terminal 12 is tightly clamped thereto. When it is desired to disengage the terminal 12 from the post 11, the bolt 20 is rotated in the opposite direction, forcing the lugs 19 apart and springing the walls of the body portion 14 apart until they are spaced from the post 11, as clearly shown in Fig. 4. The terminal 12 may then be easily disengaged from the post 11.

From the foregoing, it will be clearly apparent that my terminal will positively release itself from the terminal post of the battery. The terminal may be readily engaged and disengaged from the battery. It is simple and economical to manufacture.

While I have illustrated and described a specific form of one embodiment of my invention, this is capable of many modifications without departing from the spirit of the invention and I do not wish to be limited to the precise details of the construction set forth but desire to avail myself of all advantages within the scope of the appended claims.

Having thus described my invention, what I claim as new and desire to secure by Letters Patent of the United States is:

1. A battery terminal comprising an annular metal clamping member having a pair of outwardly projecting lugs provided with aligned apertures, said apertures having right hand and left hand threads respectively, a bolt for securing said terminal and for spreading the same, said bolt having threads complementary to those of said apertures and said bolt having a non-circular shank of reduced size adapted to pass the aperture in the adjacent lug, and a non-circular actuating head fixedly secured on said shank for actuating said bolt.

2. A battery terminal comprising an annular metal clamping member having a pair of outwardly projecting lugs provided with aligned apertures, a pair of bushings of relatively harder metal than that of said clamping member, said bushings having internal right hand and left hand threads respectively and having external anchoring ribs fixedly secured in said lugs, a bolt for securing said terminal and for spreading the same, said bolt having threads complementary to those of said threads in said bushings, and said bolt having a non-circular shank of reduced size adapted to pass the aperture in the adjacent lug, and a non-circular actuating head fixedly secured on said shank for actuating said bolt.

In witness whereof, I hereunto subscribe my name this 25th day of September, 1928.

ALBERT C. GRUNWALD.